(12) United States Patent
Terabe

(10) Patent No.: US 10,511,733 B2
(45) Date of Patent: Dec. 17, 2019

(54) SETTING METHOD AND SETTING APPARATUS OF IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Akihiro Terabe, Mishima (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/226,771

(22) Filed: Dec. 20, 2018

(65) Prior Publication Data

US 2019/0124219 A1   Apr. 25, 2019

Related U.S. Application Data

(63) Continuation of application No. 15/885,896, filed on Feb. 1, 2018, now abandoned, which is a continuation of application No. 14/310,156, filed on Jun. 20, 2014, now Pat. No. 9,924,053.

(51) Int. Cl.
  *G06F 3/12* (2006.01)
  *H04N 1/00* (2006.01)

(52) U.S. Cl.
  CPC .............. *H04N 1/00498* (2013.01)

(58) Field of Classification Search
  None
  See application file for complete search history.

(56) References Cited

U.S. PATENT DOCUMENTS

| | | | |
|---|---|---|---|
| 7,703,007 B2* | 4/2010 | Collie | G06F 17/2229 |
| | | | 715/212 |
| 7,720,460 B2* | 5/2010 | Yoshimura | G06F 17/2217 |
| | | | 455/406 |
| 9,195,808 B1 | 11/2015 | Nestler | |
| 9,405,760 B2* | 8/2016 | Shibao | G06F 16/166 |
| 9,924,053 B2* | 3/2018 | Terabe | H04N 1/00498 |
| 2007/0174108 A1 | 7/2007 | Monster | |
| 2010/0149345 A1 | 6/2010 | Hashimoto | |
| 2011/0196667 A1 | 8/2011 | Sasaki | |
| 2012/0154858 A1* | 6/2012 | Sato | G06F 17/2294 |
| | | | 358/1.15 |

(Continued)

OTHER PUBLICATIONS

Non-Final Office Action for U.S. Appl. No. 14/310,156 dated Oct. 8, 2015.

(Continued)

*Primary Examiner* — Dung D Tran
(74) *Attorney, Agent, or Firm* — Amin, Turocy & Watson, LLP

(57) ABSTRACT

In accordance with one embodiment, a setting method of an image forming apparatus including displaying character codes that the image forming apparatus supports in a case where the import of data to the image forming apparatus is instructed; receiving a selection of the character code of the data to be imported to the image forming apparatus from the displayed character codes; and importing, if the character code of the data to be imported is selected, the data to the image forming apparatus in the selected character code.

17 Claims, 10 Drawing Sheets

(56) References Cited

U.S. PATENT DOCUMENTS

| | | |
|---|---|---|
| 2013/0131842 A1 | 5/2013 | Chiba |
| 2013/0151231 A1* | 6/2013 | Giraudy .................. G06F 17/28 |
| | | 704/2 |
| 2013/0215451 A1* | 8/2013 | Tsongas ................ G06F 3/1248 |
| | | 358/1.15 |
| 2013/0314259 A1 | 11/2013 | Okayama |
| 2014/0022591 A1* | 1/2014 | Asahara ................ G06F 3/1236 |
| | | 358/1.15 |
| 2017/0147911 A1* | 5/2017 | Oishi ........................ B41J 5/30 |

OTHER PUBLICATIONS

Final Office Action for U.S. Appl. No. 14/310,156 dated May 10, 2016.
Non-Final Office Action for U.S. Appl. No. 14/310,156 dated Jan. 5, 2017.
Final Office Action for U.S. Appl. No. 14/310,156 dated Jul. 24, 2017.
Non-Final Office Action for U.S. Appl. No. 15/885,896 dated Mar. 8, 2018.
Final Office Action for U.S. Appl. No. 15/885,896 dated Sep. 21, 2018.

* cited by examiner

SETTING METHOD AND SETTING APPARATUS OF IMAGE FORMING APPARATUS

CROSS-REFERENCE TO RELATED APPLICATIONS

This application is a Continuation of application Ser. No. 15/885,896 filed Feb. 1, 2018, which is a Continuation of application Ser. No. 14/310,156 filed Jun. 20, 2014, now U.S. Pat. No. 9,924,053, the entire contents of both of which are incorporated herein by reference.

BACKGROUND

A conventional image forming apparatus executes data import and data export on the assumption that the character code of the data may be same as default setting. Thus, when the image forming apparatus imports a file different from the character code of the default setting, the characters are corrupted and cannot be displayed correctly.

DETAILED DESCRIPTION

In accordance with one embodiment, a setting method of an image forming apparatus comprising displaying character codes that the image forming apparatus supports in a case where the import of data to the image forming apparatus is instructed; receiving a selection of the character code of the data to be imported to the image forming apparatus from the displayed character codes; and importing, if the character code of the data to be imported is selected, the data to the image forming apparatus in the selected character code.

The embodiment is described below with reference to the accompanying drawings.

Figure 1:
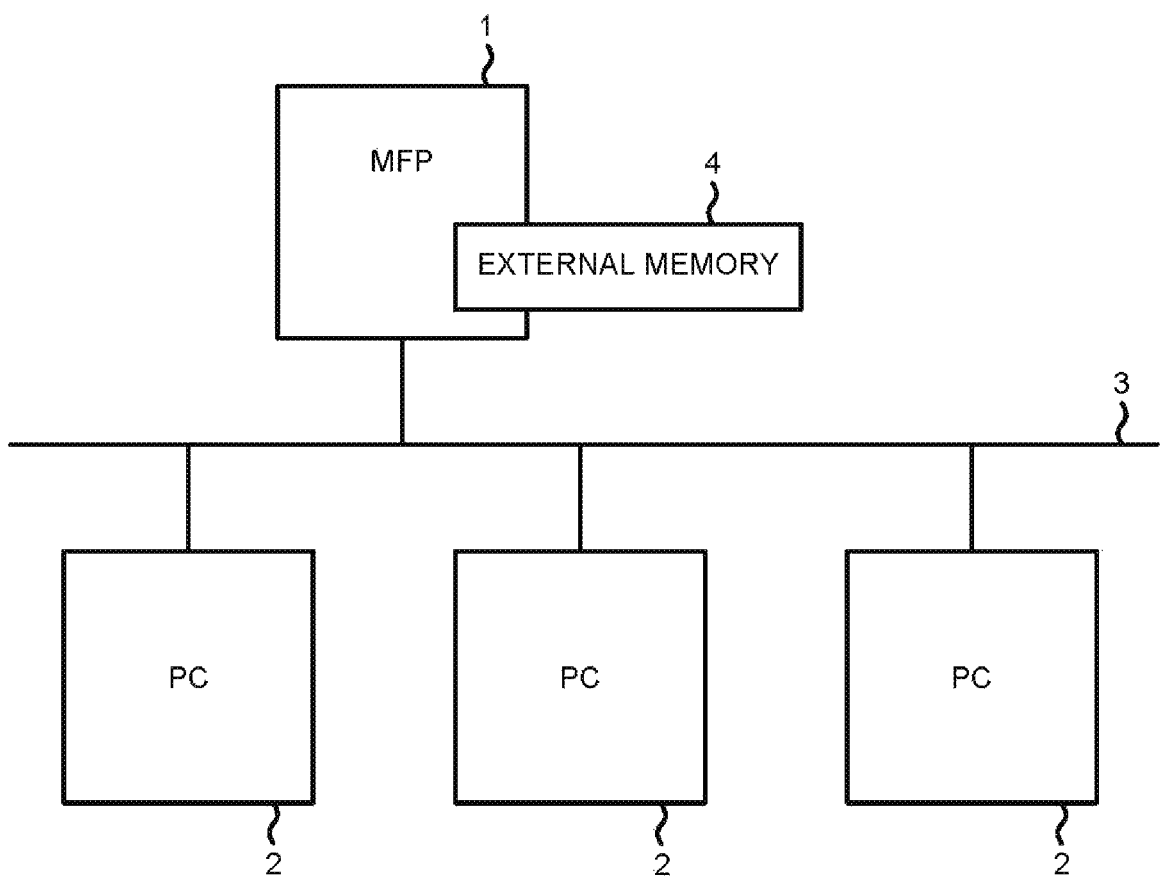
FIG. 1 is a diagram illustrating an example of the constitution of an image forming system according to one embodiment.

FIG. 1 is a diagram schematically illustrating an example of the constitution of an image forming system.

As shown in FIG. 1, the image forming system is a system constituted by connecting a digital multi-function peripheral (MFP) 1 with a PC 2 through a network 3. In the image forming system, a plurality of PCs 2 are connected with the network 3. Further, the image forming system may also be constituted by connecting a plurality of MFPs with the network 3.

The digital multi-function peripheral (MFP) 1 functions as an image forming apparatus (printing apparatus). The digital multi-function peripheral 1 has a scanning function, a printer function, a network communication function and the like. The digital multi-function peripheral 1 has a communication function for communicating data with the PC 2 through the network 3. Further, the digital multi-function peripheral 1 comprises an interface which is directly connected with an external memory 4.

The PC 2 is a computer a processor of which executes various processing by executing programs stored in a memory. The PC 2 is realized through a personal computer, a tablet terminal, or a smartphone and the like. The PC 2 functions as a user terminal which requests the MFP 1 to print. The PC 2 further functions as an administration terminal which carries out data export and data import to the MFP 1.

Further, no specific limitation is given to the network 3 as long as the communication between the MFP 1 and the PC 2 can be carried out through the network 3. The network 3 may be a communication line or a wireless network.

Next, the constitution of the digital multi-function peripheral 1 is schematically described.

Figure 2:
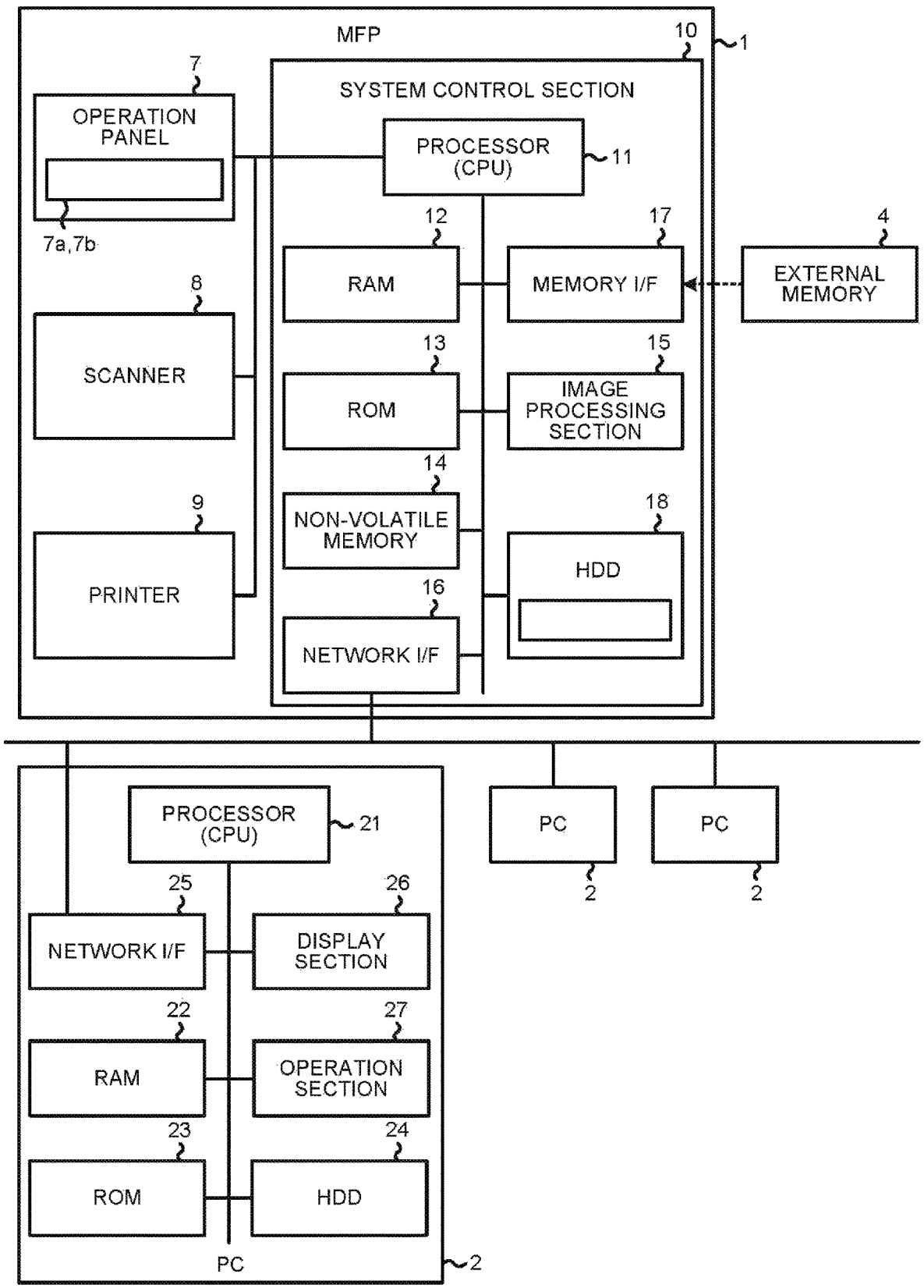
FIG. 2 is a block diagram illustrating an example of the constitution of an image forming apparatus and a PC according to the embodiment.

As shown in FIG. 2, the digital multi-function peripheral 1 comprises an operation panel 7, a scanner (image reading section) 8, a printer (image forming section) 9, a system control section 10 and the like. Further, the digital multi-function peripheral 1 comprises various interfaces for inputting and outputting data. The digital multi-function peripheral 1 functions as a copier, a scanner, a printer or a network communication machine.

The scanner 8 reads an image on a document surface as color image data or monochrome image data. The scanner 8 optically scans the document surface to read the image on the document surface. The scanner 8 includes a scanning mechanism, a photoelectric conversion section, an automatic document feeder (ADF) and the like.

The printer 9 forms a color image or a monochrome image on paper. For example, the printer 9 is an electrophotographic type image forming apparatus. However, the printer 9 is not limited to the electrophotographic type, and it may be an inkjet type printer or a thermal transfer type printer which carries out image forming processing.

The operation panel 7 is a user interface. The operation panel 7 includes, for example, a display section 7a provided with a touch panel 7b. The operation panel 7 functions as an operation section for a user to input an operation instruction and a display section for displaying guidance and the like to a user.

The system control section 10 uniformly controls each section of the MFP 1. For example, the system control section 10 controls the scanner 8 and the printer 9 to realize a copy operation. The system control section 10 comprises a processor (CPU) 11, a random access memory (RAM) 12, a read only memory (ROM) 13, a non-volatile memory 14, an image processing section 15, a network interface 16, a memory interface 17, a hard disk drive (HDD) 18 and the like.

The processor 11 is, for example, a CPU. The processor 11 executes the control programs stored in the ROM 13, the non-volatile memory 14 or the HDD 18 to realize various processing functions. The RAM 12 is a main memory functioning as a working memory. The ROM 13 stores, for example, a control program and control data in charge of the operations of the digital multi-function peripheral 1. The non-volatile memory 14 is a rewritable non-volatile memory. The non-volatile memory 14 stores, for example, a control program and control data for realizing various processing functions.

The image processing section 15 carries out image processing on image data such as the image data read by the scanner 8, the image data received through the network, or the image data input from the external memory 4. The network interface 16 is an interface for carrying out communication with the PC 2 or other MFPs through the network 3.

The external memory interface 17 is an interface for connecting the external memory 4. The external memory interface 17, for example, inputs data from the external memory 4 or outputs data to the external memory 4. For example, the external memory interface 17 is of a constitution based on a general interface standard used in the external memory 4.

The HDD 18 is a high-capacity memory for storing data. The HDD 18 stores, for example, the image data to be printed. Further, the HDD 18 stores various importable or exportable data such as an address book, a template and the like. Further, the HDD 18 may also store an application program and the like.

Next, the constitution of the PC 2 is described.

In a constitution example shown in FIG. 2, the PC 2 includes a processor (CPU) 21, a RAM 22, a ROM 23, a HDD 24, a network interface (I/F) 25, a display section 26 and a operation section 27.

The processor 21 is, for example, a CPU. The processor 21 controls the whole user terminal 2. The processor 21 executes the programs stored in the ROM 23 or the HDD 24 to realize various processing functions. The RAM 22 is a working memory. The ROM 23 stores, for example, a control program and control data in charge of the basic operations of the user terminal 2.

For example, the processor 21 executes a printer driver program for the digital multi-function peripheral 1 installed in the HDD 24 to carry out various controls on the digital multi-function peripheral 1. Further, the processor 21 requests the digital multi-function peripheral 1 to carry out a job such as an image printing job through a printer driver. Further, the processor 21 executes a MFP administration program to execute data setting, data export and data import to the MFP 1.

The HDD 24 is a storage device for storing data. The network interface 25 is an interface for carrying out data communication with each device in a local area network 5. The processor 21 sends a printing request or printing data to the digital multi-function peripheral 1 through the network interface 25. The display section 26 is a display device. The operation section 27 is an input device such as a keyboard, a pointing device and the like.

Next, the data export to the MFP 1 is described.

For example, the data export and the data import to the MFP 1 are executed through an operation on the PC 2. Further, the data export and the data import to the MFP 1 may be executed through an operation on the operation panel 7 of the MFP 1 provided with the external memory 4. Herein, it is exemplified that the export of the data of the MFP 1 is carried out through an operation on the PC 2.

Figure 3:
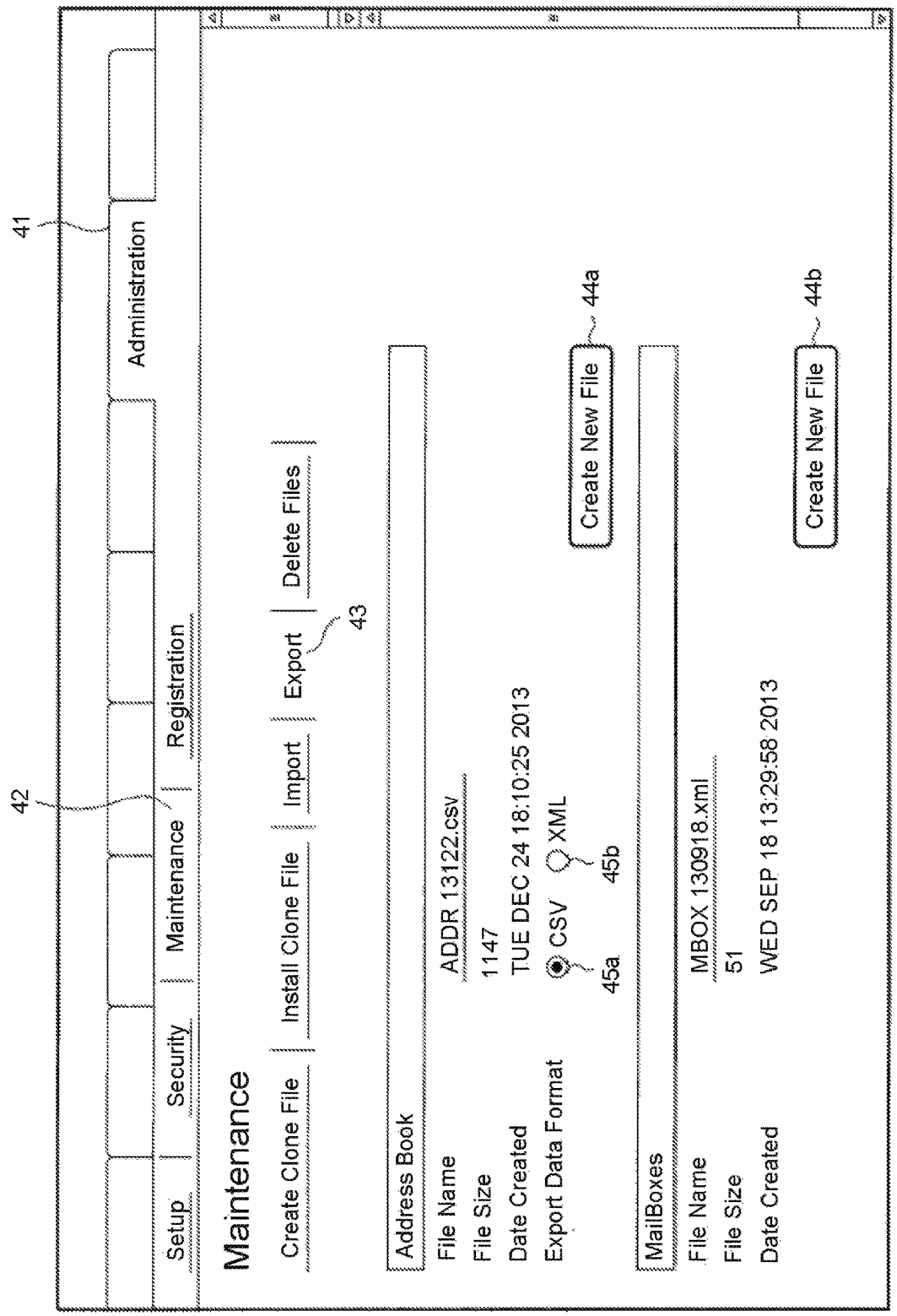
FIG. 3 is a diagram illustrating an example of an operation screen for exporting the data of the image forming apparatus according to the embodiment.

FIG. 3 is a diagram illustrating an example of an operation screen for instructing the export of the data of the MFP 1.

For example, the processor 21 of the PC 2 executes the MFP administration program stored in the HDD 24 to display an administration screen of the MFP 1 on the display section 26. On the administration screen of the MFP, various setting and various processing including the data export and the data import can be instructed. For example, in a case where an operator selects the data export on the administration screen of the MFP 1, the processor 21 displays an export operation screen shown in FIG. 3 on the display section 26.

FIG. 3 is a diagram illustrating an example of the display of an operation screen in a case where the data export is selected on the administration screen of the MFP. In a state in which an administration tag 41 is selected on the administration screen of the MFP, if a "maintenance" button 42 and an "export" button 43 are instructed, the processor 21 displays the operation screen of data export shown in FIG. 3 on the display section 26. In the display example shown in FIG. 3, the processor 21 displays an address book and mailboxes as exportable data. The processor 21 displays a file name, file size and date created for the exportable data (address book and mailboxes).

Further, in the display example shown in FIG. 3, the processor 21 displays a "create" button 44a for instructing the export of the address book and a "create" button 44b for instructing the export of the mailboxes. The "create" buttons 44a and 44b function as buttons for instructing the export of the corresponding data. Further, in the display example shown in FIG. 3, for the data of the address book, the processor 21 displays check columns 45a and 45b for selecting export data format. For example, if the operator selects a CSV format as the export data format, the processor 21 displays a mark in the check column 45a. Further, if the operator selects a XML format as the export data format, the processor 21 displays a mark in the check column 45b.

Next, the processing of exporting the data of the MFP 1 is described.

Figure 4:
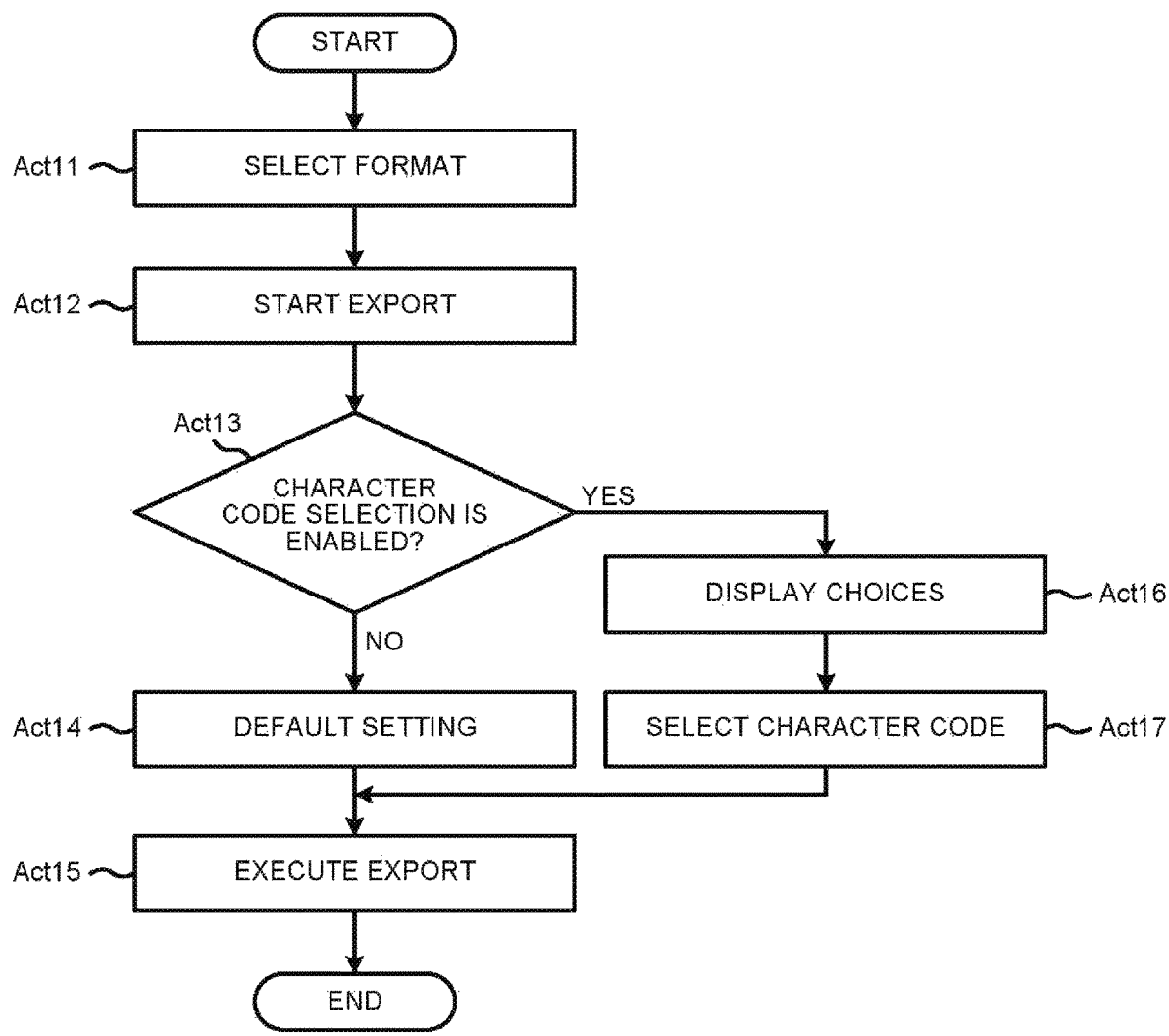
FIG. 4 is a flowchart illustrating a processing of exporting the data of the image forming apparatus according to the embodiment.

FIG. 4 is a flowchart illustrating the processing of exporting the data of the MFP 1.

In a case of exporting the data of the MFP 1, the processor 21 displays an operation screen for exporting the data of the MFP 1 on the display section 26. For example, the processor 21 displays an export selection screen such as that shown in FIG. 3. On the export operation screen, the processor 21 selects the format of the data to be exported according to the operation of the operator (ACT 11). For example, in a case where the operator selects the check column 45a on the operation screen shown in FIG. 3, the processor 21 selects the CSV format as the format of the export data. Further, as to the format of the export data, a default setting is selected in an initial state, and the format of the export data may be changed according to the instruction of the operator. In this case, if there is no instruction from the operator, the processor 21 selects the default setting as the format of the export data.

Further, the processor 21 receives an instruction of the start of the export based on the "create" button on the export operation screen. If the operator instructs the "create" button 44a or 44b, the processor 21 determines the data corresponding to the designated button as the export target (ACT 12). If the data to be exported is determined, the processor 21 determines whether or not the user selects a character code (ACT 13). Whether or not to enable the character code selection of the user is set in advance.

Figure 5:
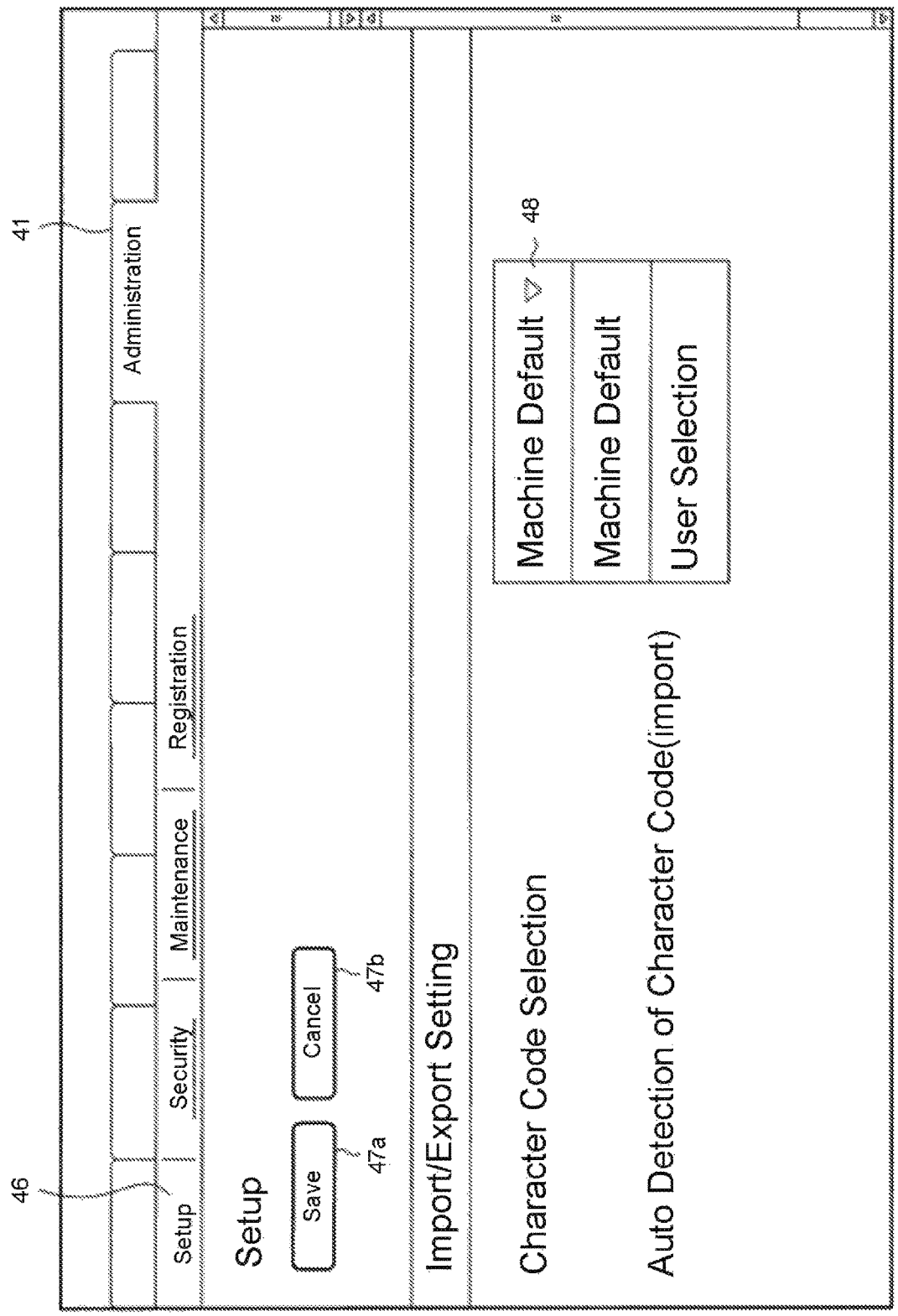
FIG. 5 is a diagram illustrating an example of the display of a setting screen for setting whether to enable or disenable the character code selection according to the embodiment.

FIG. 5 is a diagram illustrating an example of a setting screen for setting whether or not to enable the character code selection of the user.

In a case where a "setup" button 46 is selected on the administration screen of the MFP, the processor 21 displays the setting screen shown in FIG. 5 on the display section 26. The setting screen shown in FIG. 5 includes a "save" button 47a, a "cancel" button 47b and a selection column 48. The "save" button 47a is a button for instructing to store the setting content. The "cancel" button 47b is a button for instructing to cancel the input setting content. The selection column 48 is a column for setting the character code selection. For example, in a case of enabling the character code selection of the user, a "user selection" is selected in the selection column 48. Further, in a case of disenabling the character code selection of the user (that is, in a case of enabling the default setting), the user selects "machine default" in the selection column 48. If the "save" button 47a is pressed in a state in which either of the two choices in the selection column 48 is selected, the processor 21 stores the setting selected in the selection column 48.

If it is determined that the character code selection of the user is not enabled based on such a setting (NO in ACT 13), the processor 21 determines the character code of the default setting as the character code used in the export (ACT 14). If the character code selection is determined, the processor 21 executes the export for creating an export file of the selected data in the character code (ACT 15).

Further, if it is determined that the character code selection of the user is enabled according to the determination (YES in ACT 13), the processor 21 displays the choices of the character code (ACT 16). The choices of the character code present a list of the character codes that can be selected by the user. For example, the processor 21 displays the choices of the character code over the operation screen which is being displayed.

Figure 6:
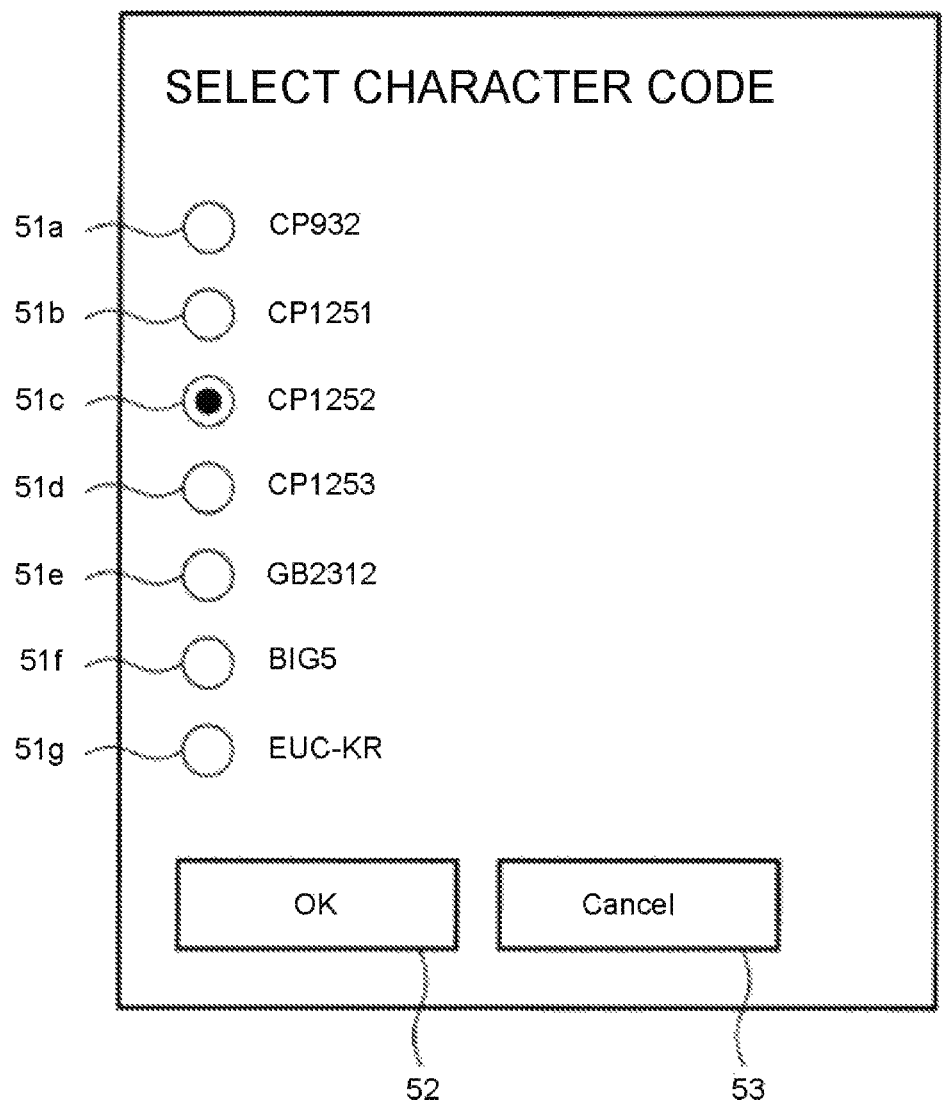
FIG. 6 is a diagram illustrating an example of the display of choices of the character code according to the embodiment.

FIG. 6 is a diagram illustrating an example of the display of the choices of the character code.

In the example of the display shown in FIG. 6, a list of the character codes, check columns 51a-51g corresponding to each character code, an "OK" button 52, a "cancel" button 53 and the like are displayed. On the list of the character codes, the MFP 1 displays a list of the character codes to be exported. Further, on the list of the character codes, in addition to the character codes, the language information for each character code may also be displayed.

In a case of displaying the language information for each character code, for example, in an example shown in FIG. 6, "CP932" representing "Japanese (CP932)", "CP1251" representing "Russian (CP1251)", "CP1252" representing "English (Latin) (CP1252)", "CP1253" representing "Greek (CP1253)", "GB2312" representing "Chinese (GB2312)", "BIG5" representing "Chinese (BIG5)" and "EUC-KR" representing "Korean (EUC-KR)" may be displayed, respectively.

A check column is displayed for each character code displayed on the list. The processor 21 displays a mark in the check column corresponding to the character code selected by the operator. Further, in a case of determining the character code selection, the operator instructs the "OK" button 52. If the operator instructs the "OK" button 52, the processor 21 determines the character code selection corresponding to the check column where a mark is displayed.

After the choices of the character code is displayed, if an instruction indicating to determine the character code selection is input, the processor 21 determines the character code selection (ACT 17). If the character code selection is determined, the processor 21 executes the export for creating an export file of the selected data in the character code (ACT 15).

In accordance with the embodiment described above, in a case where the user presses the export file creation button, the choices for selecting the character code are displayed. The character code that the MFP supports or the character code relating to the language data that the MFP supports is displayed in the choices. Further, in the choices of the character code, the character code according to the default language setting set in the MFP is displayed as an initial value. The export file is created according to the character code selected by the user. According to such an embodiment, the export file of the data is created in the character code designated by the user.

Next, the data import to the MFP 1 is described.

For example, the processor 21 of the PC 2 executes the administration program stored in the HDD 24 to display the administration screen of the MFP 1 on the display section 26. The administration screen of the MFP includes an operation screen for instructing the data import. For example, in a case where the operator selects data import on the administration screen of the MFP 1, the processor 21 displays an import operation screen on the display section 26.

Figure 7:
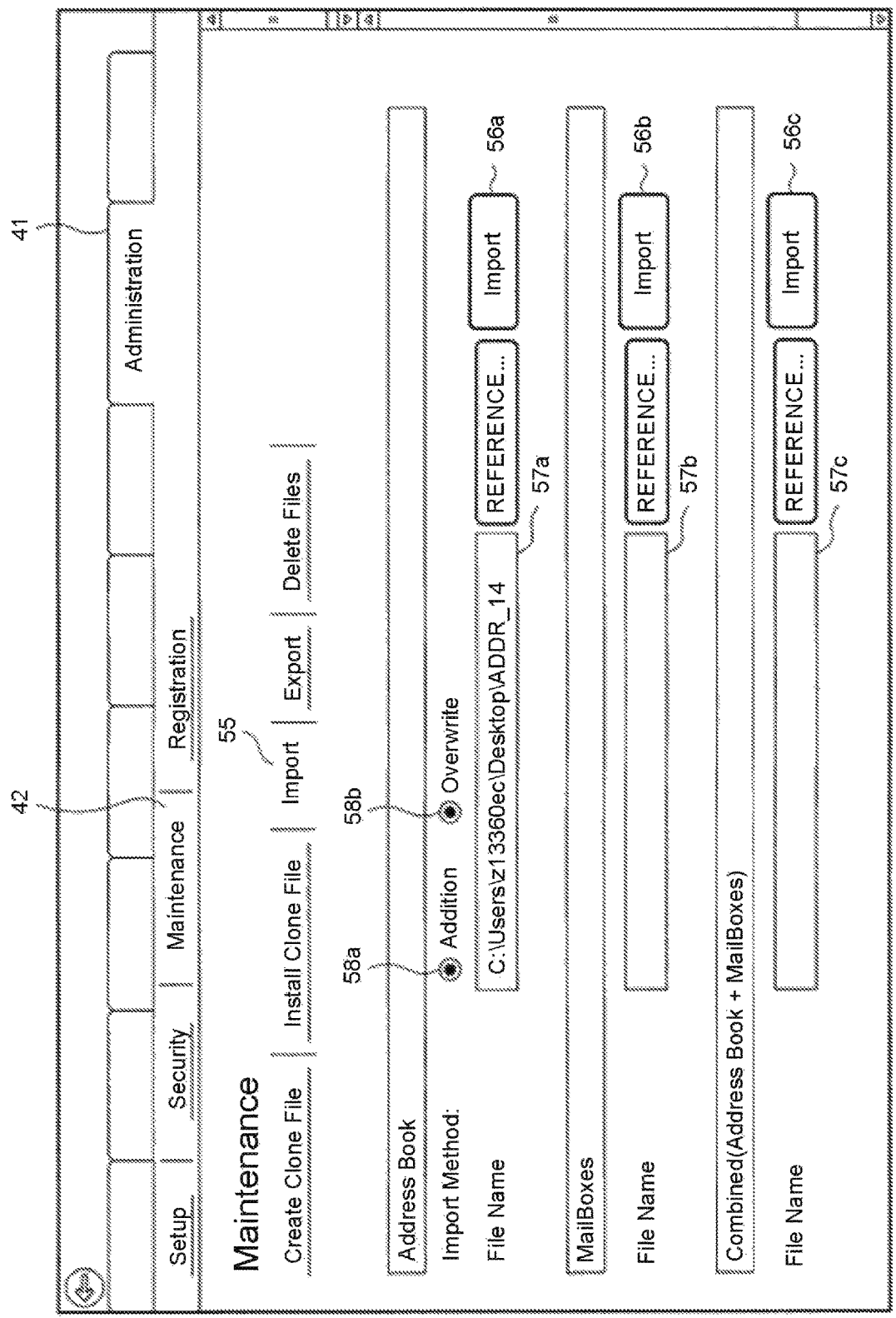
FIG. 7 is a diagram illustrating an example of an operation screen for importing data to the image forming apparatus according to the embodiment.

FIG. 7 is a diagram illustrating an example of the display of the import operation screen. FIG. 7 is an example of the operation screen in a case where the data import is selected on the administration screen of the MFP. In a state in which the administration tag 41 is selected on the administration screen of the MFP, if the "maintenance" button 42 and an "import" button 55 are instructed, the processor 21 displays a data import operation screen such as that shown in FIG. 7 on the display section 26. On the import operation screen, the processor 21 displays the data to be imported.

In an example of the display shown in FIG. 7, the processor 21 displays address book, mailboxes and the combined as the importable data. Further, the processor 21 respectively displays "import" buttons 56a, 56b and 56c and file name display columns 57a, 57b and 57c in association with each importable data (address book, mailboxes and the combined). The "import" buttons 56a, 56b and 56c are buttons for instructing the import of corresponding data. The file name display columns 57a, 57b and 57c display the information indicating the access destination of the file of the import data designated by the user. Thus, if the "import" buttons 56a, 56b and 56c are instructed, the processor 21 carries out a processing of importing the data of the access destination displayed in the file name display columns 57a, 57b and 57c.

Further, in the example shown in FIG. 7, the processor 21 also displays an import method selection column for the data the import method of which can be selected. For example, as shown in FIG. 7, for the data that can be added and overwritten, check columns 58a and 58b for selecting either of the "addition" and the "overwrite" as the import method are displayed. For example, if the operator selects "addition" as the data import method, the processor 21 displays a mark in the check column 58a. Further, if the operator selects "overwrite" as the data import method, the processor 21 displays a mark in the check column 58b.

Next, the flowchart of the data import to the MFP is described.

Figure 8:
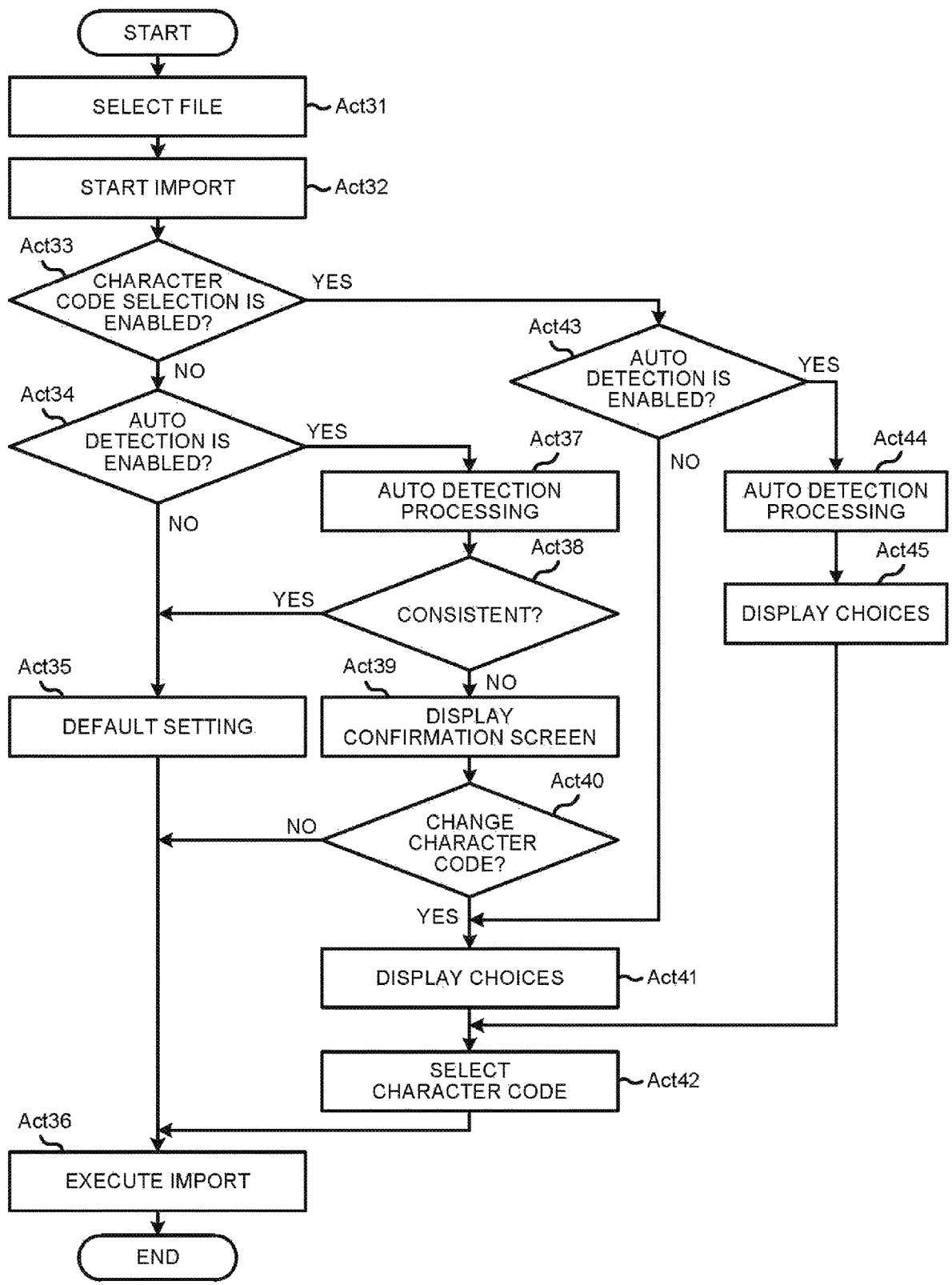
FIG. 8 is a flowchart illustrating a processing of importing data to the image forming apparatus according to the embodiment.

FIG. 8 is a flowchart illustrating the processing of importing data to the MFP 1.

In a case of importing data to the MFP, the processor 21 displays an operation screen for importing data to the MFP 1 on the display section 26. For example, the processor 21 displays an import selection screen such as that shown in FIG. 7. On the import operation screen, the processor 21 selects the file of the data to be imported according to the operation of the operator (ACT 31). The processor 21 receives the selection of the file to be imported and the instruction of the start of the import on the import operation screen. For example, on the operation screen shown in FIG. 7, the operator designates an access destination in the selection column of the data to be imported, and designates the "import" button 56a, 56b or 56c corresponding to the data the access destination of which is designated.

If the operator instructs any of the "import" buttons 56a, 56b and 56c, the processor 21 determines the file of the data corresponding to the designated button as the import target, and starts the import processing (ACT 32). If the file to be imported is determined, the processor 21 determines whether or not the character code selection of the user is enabled (ACT 33).

Whether or not to enable the character code selection of the user is set in advance. For example, whether or not to enable the character code selection of the user about the import as well as the export may also be set through the setting screen in FIG. 5. However, whether or not to enable the character code selection of the user about the export and the import may be set separately.

If it is determined that the character code selection of the user is not enabled (NO in ACT 33), the processor determines whether or not the auto detection for detecting the character code of the data to be imported is enabled (ACT 34). Whether or not to automatically detect the character code of the import data is set in advance.

Figure 9:
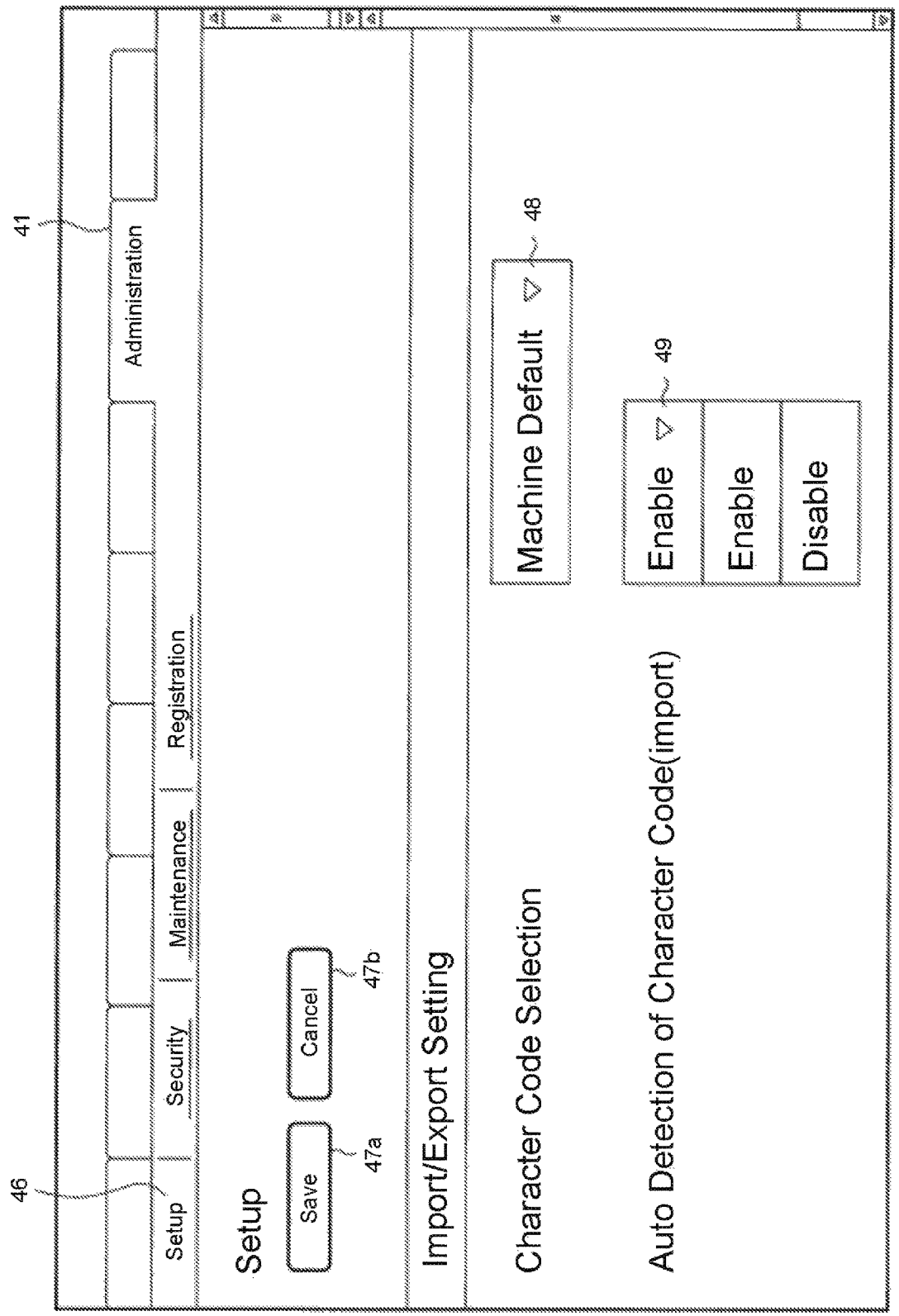
FIG. 9 is a flowchart illustrating an example of the display of a setting screen for character code auto detection processing according to the embodiment.

FIG. 9 is a diagram illustrating an example of a setting screen for setting whether or not to automatically detect the character code of the import data.

If the "setup" button 46 is selected on the administration screen of the MFP, the processor 21 displays the setting screen shown in FIG. 9 on the display section 26. The setting screen shown in FIG. 9 includes a selection column 49. The setting screen shown in FIG. 9, which is almost the same as the setting screen shown in FIG. 5 except the selection column 49, also includes the "save" button 47a, the "cancel" button 47b and the selection column 48. The selection column 49 is a column for setting whether to enable or disenable the auto detection of the character code.

For example, in a case of enabling the auto detection of the character code for the import data, "Enable" is selected in the selection column 49. Further, in a case of disenabling the auto detection, the user selects "Disable" in the selection column 49. If the "save" button 47a is pressed in a state in which either of the two choices in the selection column 49 is selected, the processor 21 stores the setting selected in the selection column 49.

If it is determined that the character code selection is disenabled and the auto detection is not enabled (NO in ACT 34), the processor 21 determines the character code of the default setting as the character code used in the import (ACT 35). If the character code selection is determined, the processor 21 imports the selected data to the MFP in the character code (ACT 36).

If it is determined that the character code selection is disenabled and the auto detection is enabled (YES in ACT 34), the processor 21 carries out the character code auto detection processing on the data to be imported (ACT 37).

As to the character code auto detection processing, a method of picking up and determining the character code contained in the detection target data, a method of recognizing the character code information contained in the header of the file and the like are considered. In the former case, the processor 21 picks up a plurality of character codes from the target data, respectively checks which character code the picked up character codes match with, and then determines the character code with which most codes match as the character code of the data.

If the result of the auto detection of the character code is obtained, the processor 21 determines whether or not the character code severing as the auto detection result is consistent with the character code of the default setting (ACT 38). If it is determined that the character code severing as the auto detection result is consistent with the character code of the default setting (YES in ACT 38), the processor 21 determines the character code of the default setting as the character code used in the import (ACT 35). If the character code selection is determined, the processor 21 imports the selected data to the MFP 1 in the character code (ACT 36).

Further, if it is determined that the character code severing as the auto detection result is not consistent with the character code of the default setting (NO in ACT 38), the processor 21 displays a confirmation screen asking for the confirmation of the setting of the character code (ACT 39). The confirmation screen of the character code may be a screen which displays the character code of the default setting to ask for the confirmation of the character code, or a screen which displays the character code severing as the auto detection result to ask for the confirmation of the character code, or a screen which displays the character code of the default setting and the character code severing as the auto detection result to guide that the two character codes are different.

Figure 10:
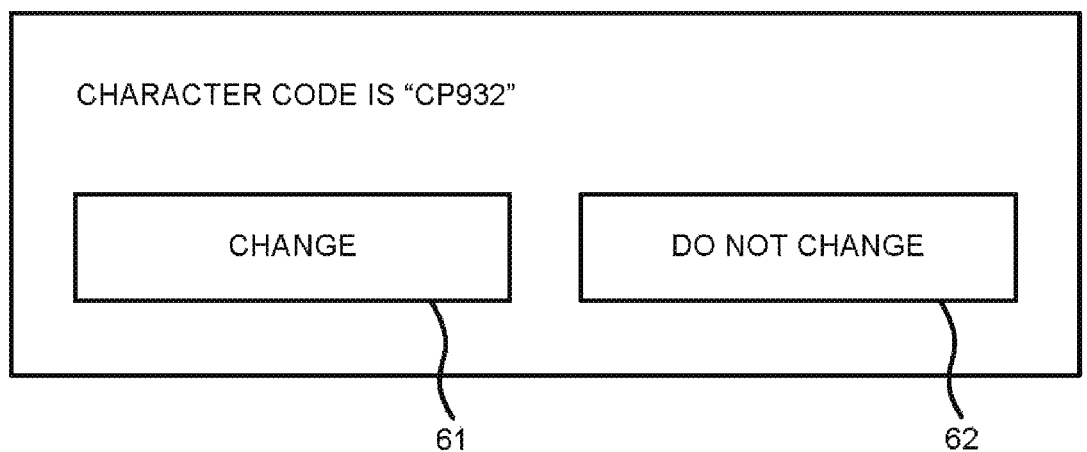
FIG. 10 is a diagram illustrating an example of the display of a confirmation screen of the character code according to the embodiment.

FIG. 10 is a diagram illustrating an example of a confirmation screen of the character code.

In the example of the confirmation screen shown in FIG. 10, in addition to the character code severing as the auto detection result, a "change" button 61 and a "do not change" button 62 for selecting whether or not to change the character code are also displayed. On the confirmation screen shown in FIG. 10, in a case of changing the character code, the user instructs the "change" button 61. Further, in a case of not changing the character code (in a case of determining the automatically detected character code as the character code used in the import), the user instructs the "do not change" button 62.

In a case of not changing the character code (NO in ACT 40), the processor 21 sets the automatically detected character code as the character code used in the import as it is. If the character code selection is determined, the processor 21 imports the selected data to the MFP in the character code (ACT 36).

In a case of changing the character code (YES in ACT 40), the processor 21 displays the choices of the character code in a state in which the character code of the default setting is selected as the initial value (ACT 41). In addition, in a case where the change of the character code is instructed, it is expected that the user desires to change the character code, thus, the processor 21 may also display the choices of the character code in a state in which the character code severing as the auto detection result is selected as the initial value.

If the choices of the character code are displayed, the processor 21 determines the character code according to the instruction of the user on the choices of the character code (ACT 42). If the character code is determined, the processor 21 imports the selected import data to the MFP in the determined character code (ACT 36).

Further, if it is determined that the character code selection of the user is enabled (YES in ACT 33), the processor 21 determines whether or not the auto detection for detecting the character code of the data to be imported is enabled (ACT 43).

If it is determined that the character code selection is enabled and the auto detection of the character code is enabled (YES in ACT 43), the processor 21 carries out the character code auto detection processing on the data to be imported (ACT 44). If the result of the auto detection of the character code is obtained, the processor 21 displays the choices of the character code in a state in which the character code severing as the auto detection result is selected as the initial value (ACT 45).

If it is determined that the character code selection is enabled and the auto detection of the character code is not enabled (NO in ACT 43), the processor 21 displays the choices of the character code in a state in which the character code of the default setting is selected as the initial value (ACT 41).

If the choices of the character code are displayed, the processor 21 determines the character code according to the instruction of the user on the choices of the character code (ACT 42). If the character code is determined, the processor 21 imports the selected import data to the MFP in the determined character code (ACT 36).

In accordance with the import processing described above, in a case where the user designates the import file and instructs the start of the import, the character code selection of the user to whom the list of the character codes are presented is received. Further, a processing of detecting the character code of the import file is carried out, and the detected character code is presented to the user to ask the user to confirm whether or not to change the character code. Moreover, in a case where the automatically detected character code is not consistent with the character code of the default setting, a message for drawing the attention of the user is displayed, and the choices of the character code are displayed to the user if needed.

Further, the information relating to the language data that the MFP serving as the import destination supports is also displayed in the choices for selecting the character code of the import file. In this way, the selection of the character code corresponding to the language data can be carried out easily.

Though it is exemplified in the embodiment described above that the PC 2 carries out export and import to the MFP 1, the operations described above may be carried out by the system control section of the MFP 1. In this case, the program for realizing the operations is installed in a non-volatile memory of the system control section, and the system control section of the MFP 1 carries out the operations by executing the program stored in the non-volatile memory with a processor.

For example, in the MFP 1, in a case of carrying out the export and import described above, the export file is stored in the external memory 4 which is directly connected with the MFP 1, and the import file can be imported to the MFP 1 from the external memory 4. In this way, the export and import described above can be realized without using the network. As a result, even for an image forming apparatus of an image forming system without a network environment or a stand-alone image forming apparatus, the character code can be selected by a user and the export and import can be carried out.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A setting method of an image forming apparatus, comprising:
    holding, in a memory a setting of whether or not to enable a user to select a character code, and a setting of whether or not to enable auto detection of a character code of data to be imported;
    in a case of a setting of enabling a user to select a character code, displaying a character code selection, and importing the data by a character code determined to be selected from the selection;
    in a case of a setting of disenabling a user to select a character code, and disenabling auto detection of a character code, importing the data by a character code of a default setting; and
    in a case of a setting of disenabling a user to select a character code, and enabling auto detection of a character code, detecting a character code of the data to be imported, and importing the data by the detected character code.

2. The setting method of an image forming apparatus according to claim 1, wherein,
    in a case of a setting of enabling a user to select a character code, and enabling auto detection of a character code, detecting a character code of data to be imported, and displaying a character code selection in which the detected character code is displayed as being selected; and
    in a case of a setting of enabling a user to select a character code, and disenabling auto detection of a character code, displaying a character code selection in which a character code of a default setting is displayed as being selected.

3. The setting method of an image forming apparatus according to claim 1, wherein, in the character code selection, a selectable character code is associated with language information corresponding to a character code.

4. The setting method of an image forming apparatus according to claim 2, wherein, in the character code selection, a selectable character code is associated with language information corresponding to a character code.

5. The setting method of an image forming apparatus according to claim 1, wherein, in a case of a setting of disenabling a user to select a character code, and enabling auto detection of a character code, if the detected character code is a character code of a default setting, displaying a confirmation screen of a character code, and importing data by a confirmed character code in the confirmation screen of the character code.

6. The setting method of an image forming apparatus according to claim 5, wherein the character code of the default setting is displayed on the confirmation screen of the character code.

7. The setting method of an image forming apparatus according to claim 5, wherein the detected character code is displayed on the confirmation screen of the character code.

8. The setting method of an image forming apparatus according to claim 5, wherein the confirmation screen of the character code displays the character code of the default setting and the detected character code.

9. A setting apparatus of an image forming apparatus, comprising:
a display;
an operation panel;
a memory configured to store a command; and
a processor configured to execute the command stored in the memory, wherein the processor executes:
holding a setting of whether or not to enable a user to select a character code, and a setting of whether or not to enable auto detection of a character code of data to be imported;
in a case of a setting of enabling a user to select a character code, displaying a character code selection on the display, and importing the data by a character code determined to be selected from the selection;
in a case of a setting of disenabling a user to select a character code, and disenabling auto detection of a character code, importing the data by a character code of a default setting; and
in a case of a setting of disenabling a user to select a character code, and enabling auto detection of a character code, detecting a character code of the data to be imported, and importing the data by the detected character code.

10. The setting apparatus of an image forming apparatus according to claim 9, wherein the processor further executes:
in a case of a setting of enabling a user to select a character code, and enabling auto detection of a character code, detecting a character code of data to be imported, and displaying a character code selection in which the detected character code is displayed as being selected; and
in a case of a setting of enabling a user to select a character code, and disenabling auto detection of a character code, displaying a character code selection in which a character code of a default setting is displayed as being selected.

11. The setting apparatus of an image forming apparatus according to claim 9, wherein, in the character code selection, a selectable character code is associated with language information corresponding to a character code.

12. The setting apparatus of an image forming apparatus according to claim 10, wherein, in the character code selection, a selectable character code is associated with language information corresponding to a character code.

13. The setting apparatus of an image forming apparatus according to claim 9, wherein the processor executes:
in a case of a setting of disenabling a user to select a character code, and enabling auto detection of a character code, if the detected character code is a character code of a default setting, displaying a confirmation screen of a character code, and importing data by a confirmed character code in the confirmation screen of the character code.

14. The setting apparatus of an image forming apparatus according to claim 13, wherein the character code of the default setting is displayed on the confirmation screen of the character code.

15. The setting apparatus of an image forming apparatus according to claim 13, wherein the detected character code is displayed on the confirmation screen of the character code.

16. The setting apparatus of an image forming apparatus according to claim 13, wherein the confirmation screen of the character code displays the character code of the default setting and the detected character code.

17. An image forming apparatus comprising the setting apparatus of according to claim 9.

* * * * *